US005111582A

United States Patent [19]

Pieroni

[11] Patent Number: 5,111,582

[45] Date of Patent: May 12, 1992

[54] ERGONOMIC HANDLE FOR CUTTING MACHINE

[75] Inventor: Robert J. Pieroni, Youngstown, N.Y.

[73] Assignee: Eastman Machine Company, Buffalo, N.Y.

[21] Appl. No.: 756,823

[22] Filed: Sep. 9, 1991

[51] Int. Cl.[5] ........................ B25F 3/00; A47B 95/02; F16C 11/00

[52] U.S. Cl. ............................... 30/225; 16/DIG. 34; 403/113

[58] Field of Search ................. 30/225, 340, 346, 275; 16/DIG. 19, DIG. 18, 112, 113, 124; 83/936, 937, 938, 939, 940, 941; 51/241 P, 242, 244, 245, 246; 403/92, 93, 95, 113

[56] References Cited

U.S. PATENT DOCUMENTS 828,763 8/1906 Morehouse .................. 16/DIG. 34
1,336,174 4/1920 Way .................. 16/DIG. 34
1,754,767 4/1930 Potter .................. 16/DIG. 25
3,419,295 12/1968 Small .................. 403/92
4,353,361 10/1982 Foster .................. 403/113
4,617,737 10/1986 Jung .................. 30/275

*Primary Examiner*—Douglas D. Watts
*Assistant Examiner*—Paul M. Heyrana, Sr.
*Attorney, Agent, or Firm*—Hodgson, Russ, Andrews, Woods & Goodyear

[57] ABSTRACT

An ergonomic handle mechanism for a cutting machine having a vertically reciprocating knife. The position of the handle between a horizontal orientation and an orientation at an angle thereto is adjustable for greater comfort as well as a longer working time without tiring so that greater productivity may be achieved. A link to which the handle is attached is pivotally mounted to a block which is fixedly attached to the machine housing. A pin having an eccentric portion received in a groove in the link is provided to determine handle position by the rotational position of the pin. A projection is provided on the block for limiting the pivotal movement of the link and thus acting as a stop in case of pin breakage.

21 Claims, 2 Drawing Sheets

Fig. 4.
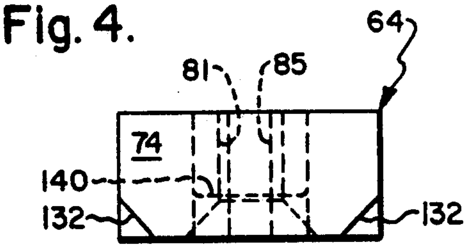
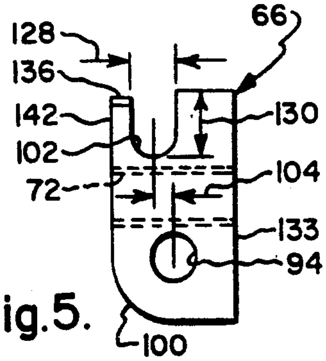
Fig. 5.
Fig. 6.
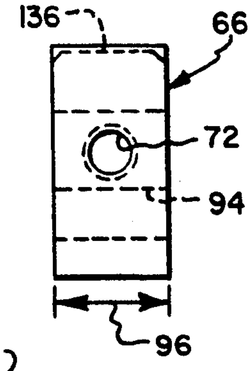
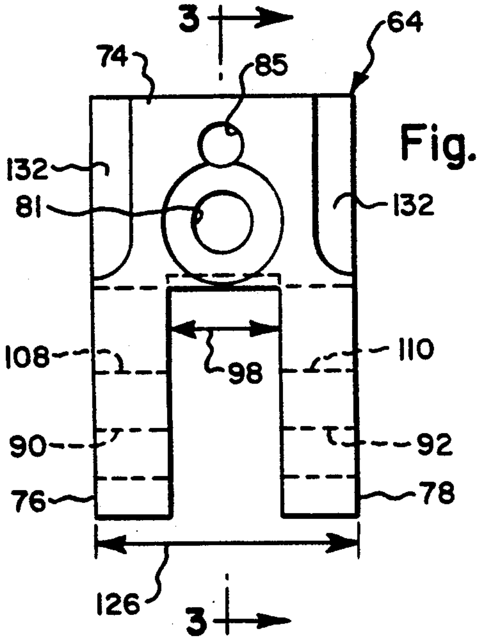
Fig. 2.
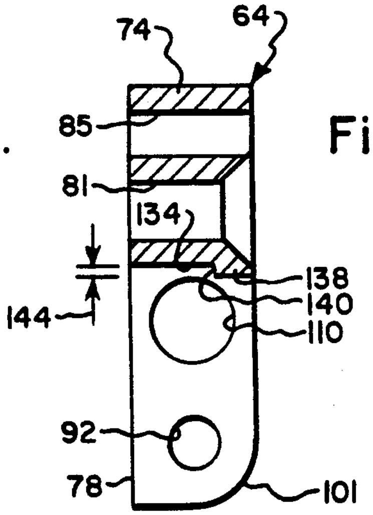
Fig. 3.
Fig. 7.
Fig. 11.
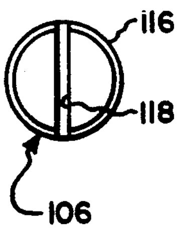
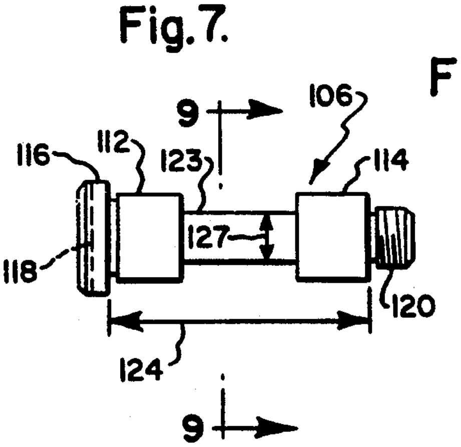
Fig. 8.
Fig. 9.
Fig. 10.
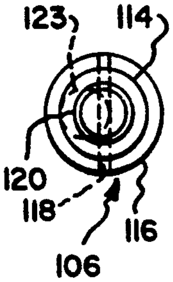

ERGONOMIC HANDLE FOR CUTTING MACHINE

The present invention relates generally to cutting machines such as for cutting cloth, as exemplified by U.S. Pat. Nos. 3,960,244 to Clark, 3,775,913 to Clark, and 3,714,742 to Clark, which patents are assigned to the assignee of the present invention and which are incorporated herein by reference. More particularly, the present invention relates to cutting machines which have a vertically reciprocating knife for cutting cloth or the like and a base which is moveable along a surface for receiving of material in position for cutting by the knife.

The use of such a cloth-cutting machine is illustrated in the '913 patent. The machine includes a base having rollers which roll on a tabletop supporting the lay of material to be cut. As the machine is thus moved over the tabletop and guided for cutting of the cloth by an operator who grasps the machine by a handle for such movement, a straight knife is reciprocated vertically for cutting of the cloth.

The handle for such a machine is rigidly attached to the housing by means of a stud which is screwed into an end of the handle and threadedly engages a lock ring and is screwed into a bracket or plate for rigid attachment thereto so that the handle extends horizontally outward from the housing, i.e., parallel to the base so that it is parallel to the tabletop surface, for grasping by the operator's hand for movement thereof. The bracket is in turn rigidly attached to the housing by means of a two-axis connection, i.e., two screws the head of one of which lockingly overlaps the head of the other to prevent its loosening.

Movement of the machine along a surface for cutting cloth requires a continuous expenditure of energy by the operator with fatigue eventually resulting. When the handle is in the horizontal position, a greater use of the thumb muscle is generally required. Greater comfort as well as more productive use of a cutting machine by an operator could be achieved if the machine were constructed in such a way that there is less use of the thumb muscle and greater use of the elbow muscle with resultingly less fatigue to an operator during use.

It is accordingly an object of the present invention to construct such a cutting machine so that such fatigue symptoms may be reduced to achieve a longer working time before rest for increased productivity as well as greater operator comfort.

It is a further object of the present invention to provide such a machine which is safe to operate.

In accordance with the present invention, an adjustable handle mechanism is provided which allows the handle to be adjusted so that it may be oriented at a small angle downwardly through a range of perhaps 14 degrees such that the operator may adjust it to a suitable angle for a more effective use of his elbow muscle and less use of his thumb muscle so that fatigue symptoms are lessened for greater labor capacity as well as greater operator comfort. The handle is connected to a link which is pivotally connected to a block which is attached to the housing. The angular position of the handle is adjusted by means of a second pin which has an eccentric portion in cooperative engagement with the link. A projection may be provided on the block to engage the link to act as a stop for preventing angular movement of the handle beyond a predetermined position in case, for example, the second pin breaks. This allows the handle position to be safely retained within the predetermined angle.

The foregoing and other objects, features, and advantages of the present invention will become more apparent from the following detailed description thereof taken in conjunction with the accompanying drawings in which the preferred embodiment of this invention is illustrated and wherein like reference numerals denote like or similar parts throughout the several views.

BRIEF DESCRIPTION OF THE DRAWINGS

FIG. 2 is a front elevation view of a block for the handle mechanism of the machine of FIG. 1.

FIG. 3 is a sectional view of the block of FIG. 3 taken along lines 3—3 thereof.

FIG. 4 is a top view of the block of FIG. 2.

FIG. 5 is a side elevation view of the link for the handle mechanism of FIG. 1.

FIG. 6 is a front elevation view of the link of FIG. 5.

FIG. 7 is a side view of the eccentric pin for the handle mechanism of FIG. 1.

FIG. 8 is a side view, partly in section, of a nut for the pin of FIG. 7.

FIG. 9 is a sectional view of the pin of FIG. 7 taken along lines 9—9 thereof.

FIG. 10 is an end view of one end of the pin of FIG. 7.

FIG. 11 is an end view of the other end of the pin of FIG. 7.

DETAILED DESCRIPTION OF THE PREFERRED EMBODIMENT

Figure 1:
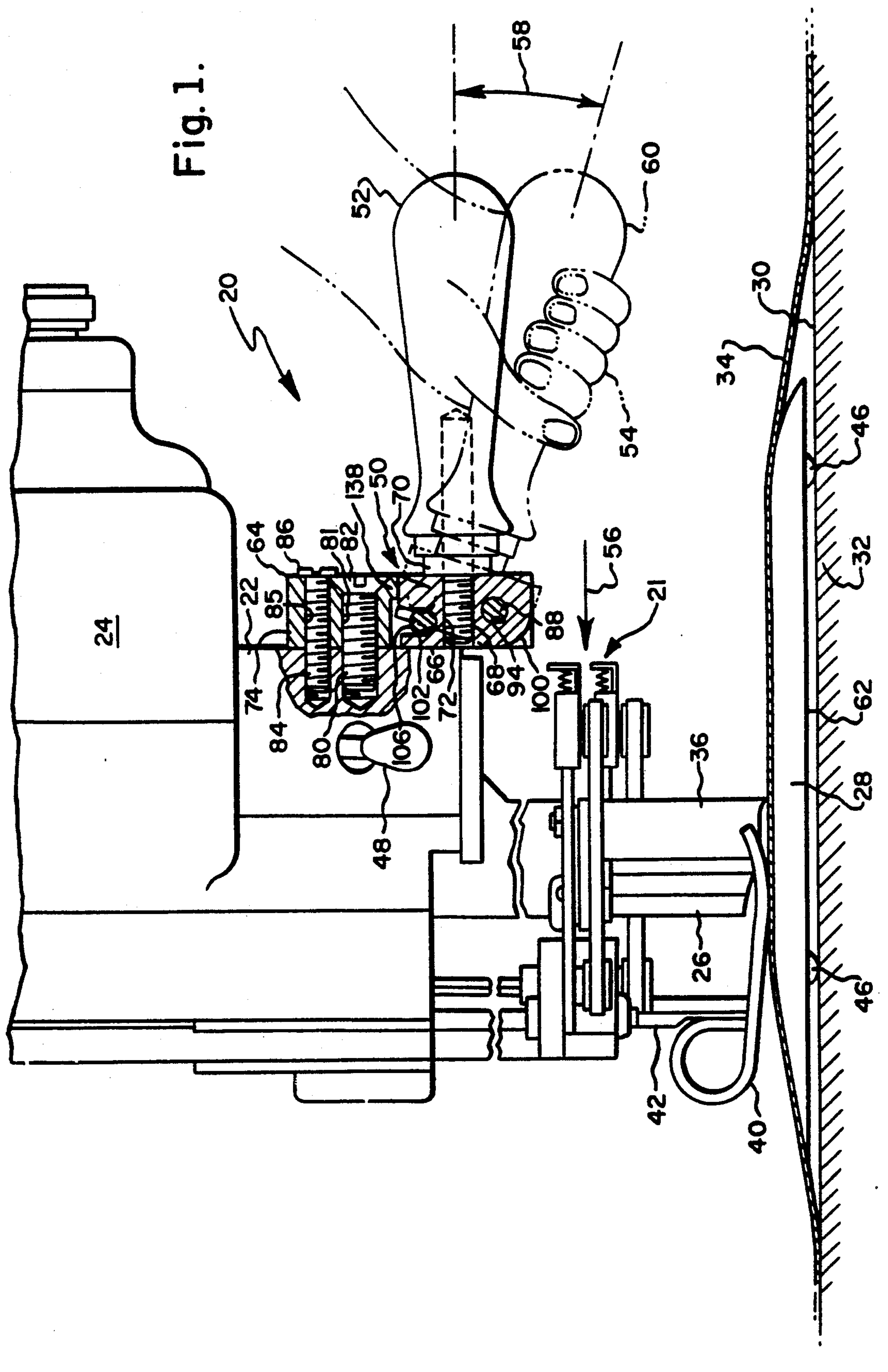
FIG. 1 is a partial side view, partly in section, of a cloth-cutting machine which embodies the present invention.

Referring to the drawings, there is shown generally at 20 a cloth-cutting machine which is generally of the type shown in the aforesaid patents to Clark. Some of the details thereof which are not germane to the present invention are left out for ease of illustration. Reference should be made to the aforesaid Clark patents for such details. The machine 20 includes a housing 22 which mounts a suitable electric motor 24 which provides vertically reciprocating motion to a straight knife 26 which, as shown in FIG. 1, is oriented vertically when the machine 20 is suitably in an upright position for normal use.

The machine 20 includes a base 28 which is adapted to rest on the upper surface 30 of a table 32 and to be moved about underneath a stack or lay of cloth 34 to be cut. Rigidly affixed to and extending upwardly from base 28 is a standard 36 the upper end of which supports the frame 22. The knife 26 is contained in a vertical guide (not shown) mounted in standard 36. A knife sharpening mechanism, which is more fully described in the aforesaid '913 patent, is illustrated generally at 21. A presser foot 40 is rigidly secured to the lower end of a bar 42 which extends vertically downwardly from frame 22 and is suitably mounted for vertical adjustment so as to set the presser foot 40 at different levels according to the thickness of the material 34 which is to be cut. Attached to the undersurface of the base 28 are a plurality of rollers 46 which provide ease of movement of the machine 20 along the tabletop surface 30. A suitable switch 48 is provided for turning the motor on for reciprocating operation of the knife 26. Rigidly attached to the frame 22 is a handle mechanism 50 supporting an elongate handle 52 which extends outwardly from the frame 22 for grasping by the hand 54 of an operator for pushing the machine 20, in the direction illustrated by arrow 56, along the surface 30 for receiving of the material 34 in position for cutting by the knife 26. A lever (not shown) is positioned near the handle for actuation by the operator for adjusting the height of the presser foot 40.

A horizontal position such as shown for the handle of the machine of the '913 patent may tend to require a greater use of thumb muscles during use with the result that the operator may tire more easily. In order to allow a greater use of the elbow muscles so as to reduce fatigue for greater productivity, as well as greater operator comfort, the handle mechanism 50 of the present invention is constructed so that the handle 52 may slant downwardly at a more suitable angle relative to the horizontal for the operator. This angle is illustrated at 58 in FIG. 1 wherein the handle is shown horizontally in solid lines and is also illustrated in phantom lines 60 to be inclined to the horizontal direction. By "horizontal" direction is meant a direction parallel to the undersurface 62 of the base 28 or perpendicular to a plane in which the knife 26 reciprocates so as to be parallel to surface 30 when the machine 20 is in an upright position on surface 30 for cutting cloth 34, as shown in FIG. 1.

Since the optimum angle 58 may vary for different individuals at different times and under different working conditions, the handle mechanism 50 is constructed so that the position of the handle 52 may be adjusted within predetermined limits. An angle 58 greater than 0 degrees may allow greater use of the elbow muscle for greater operator comfort as well as to allow longer working time before rest. As the angle 58 increases beyond about 14 degrees, it may become harder to turn the machine 20 with the wrist muscles for steerage thereof. An angle 58 greater than about 14 degrees may also start to restrict the height of the fabric 34 that can be cut. Thus, in order to allow the handle 52 position to be adjusted to an optimum position for use, the handle mechanism 50 is suitably constructed for adjustability of the angle 58 between about 0 and 14 degrees relative to the horizontal direction, the handle 52 extending downwardly, as shown in FIG. 1, as it extends outwardly from the housing 22.

In accordance with the present invention, the handle mechanism 50 includes a block 64 to which is pivotally engaged a link 66. The block and link 64 and 66 respectively are composed of 1018 cold rolled carbon steel having a black ozide finish or other suitable material. The link 66 is connected to handle 52 by suitable means such as a stud 68 extending axially from the handle end and threadedly engaged to a lock ring 70 and an aperture 72 in the link 66. Although the link 66 and handle 52 could, if desired, be made as an integral unit, their manufacture as separate items allows the handle 52 to be composed of wood or any other suitable material different from the material of which the link 66 is composed.

As shown in FIG. 2, the block 64 is in the shape of a yoke having an upper portion 74 from which extend downwardly a pair of parallel arms 76 and 78. The upper portion 74 is rigidly attached to the housing 22 by what may be called a two-axis connection, i.e., by a first screw 80 which is received in aperture 81 and which has a counter-sunk head 82 and by a second screw 84 which is received in aperture 85 and which has a flat head 86 and which is positioned relative to the first screw 80 so that the head 86 lockingly overlaps the head 82 to assure against loosening of the first screw 80 so that the handle mechanism 50 may be secured more safely. However, it should be understood that other suitable means for attachment of the block 64 to the housing 22 may be provided in accordance with the present invention. The provision of the two-axis connection permits the handle mechanism 50 to be retrofitted to existing machines having non-adjustable handles which are attached to plates having similar two-axis connections.

The link 66 is suitably pivotally mounted between the arms 76 and 78 by means of a suitable hardened dowel pin 88 which is press fit in apertures 90 and 92 in the lower portions of arms 76 and 78 respectively and a corresponding aperture 94 in the lower portion of link 66. The width, illustrated at 96, of link 66 is equal substantially to the distance, illustrated at 98, between arms 76 and 78 to provide a tight fit so as to eliminate or reduce lateral play of the handle.

As shown in FIG. 1, the link 66 pivots about pin 88 for adjustment of the handle 52 through the angle 58. The rear lower corner 100 thereof is rounded for an aesthetically pleasing appearance with the center of aperture 94 being the center for the radius at which it is rounded. In order to prevent interference with the handle movement by the block 64, the lower facing corner 101 thereof is rounded with the center of aperture 92 being the center for the radius at which it is rounded.

Formed in the upper surface of link 66 and across the width 96 thereof is a groove or way 102. The vertical center line of this groove 102 is offset from the vertical center line of aperture 94 a distance which is illustrated at 104 when angle 58 is equal to 0 degrees. A shoulder pin, illustrated at 106 in FIG. 7, is inserted in apertures 108 and 110 in the upper portions of arms 76 and 78 respectively and is received in groove 102. Shoulder pin 106 has a pair of axially spaced portions 112 and 114 sized to be snugly received in apertures 108 and 110 respectively for rotable movement therein. One end of pin 106 has a flat head 116 which may have a groove 118 or other suitable means in the face thereof for insertion of a screwdriver or the like for adjustment of the rotational position of the pin 106. The other end of pin 106 terminates in a threaded portion 120 to which may be threadedly secured a suitable nut 122 for securing the pin to the block 64 and for insuring retention of a fixed rotational position thereof as determined by use of a screwdriver in slot 118. The shoulder pin 106 and nut 122 may be composed of 41L40 alloy steel with a black ozide finish or other suitable material. In order to assure sufficient tightness to maintain the rotational position of the pin 106 during machine use, the distance, illustrated at 124, between the head 116 and the threaded portion 120 (or axially outer surface of portion 114) is suitably selected to be less than the block width, illustrated at 126, and the nut 122 is selected to be oversize so that it engages the block 64 to tighten thereagainst. For example, distance 124 may be 1.740 inch, width 126 may be 1.750 inch, the diameters of each of portions 112 and 114 may be 0.561 inch, and the nut 122 may be a 7/8 inch hex nut with a 7/32 inch width. Thus, with distance 124 being less than distance 126, the block 64 may be grabbed between the head 116 and nut 122 during tightening to ensure that the rotational position of the shoulder pin 106 is maintained during use of the machine 20 once the Adjustability of the handle position is provided by the portion 123 of shoulder pin 106 which lies between portions 112 and 114 and which is received in groove 102 of link 66. The longitudinal axis of portion 123 is offset from the longitudinal axis of portions 112 and 114 so that it is eccentric relative thereto, as shown in FIGS. 9 and 10. The diameter, illustrated at 127, of eccentric portion 123 is equal substantially to the width, illustrated at 128, of groove 102 so as to fit snugly, but without binding, therein. The depth of groove 102, illustrated at 130, is such as to allow vertical movement of the eccentric portion 123 during 180 degrees rotation of pin 106. For example, depth 130 may perhaps be $\frac{3}{8}$ inch. During rotation of pin 106 through 180 degrees, as effected by a screwdriver in slot 118, the axis of eccentric portion 123 is displaced horizontally over a distance corresponding to an angle 58 of 14 degrees. This horizontal displacement of eccentric portion 123 effects pivotal movement of link 66 about dowel pin 88 so that its front surface 133 to which handle 52 is attached changes from a vertical position to a position which is inclined to the vertical, as shown by solid and phantom lines respectively in FIG. 1, so that the angle 58 is increased to the maximum of 14 degrees. The bottom of the groove 102 prevents rotation of the eccentric portion 123 beyond 180 degrees. The handle position is thus changed incrementally during rotation of the shoulder pin 106 so that any intermediate position of the handle may be attained by rotating the shoulder pin 123 to an intermediate position between 0 and 180 degrees. After the handle position is determined, the nut 122 is tightened onto shoulder pin 106 to maintain the desired position. With the handle in the horizontal position, distance 104 may perhaps be 0.122 inch for an eccentric portion diameter 127 of 0.312 inch. Thus, during rotation of the pin 106 through 180 degrees, the eccentric portion 123 is moved from one side to the other of the center line of dowel pin 88 or aperture 94.

The front edges of the upper portion 74 of block 64 are chamfered or beveled at perhaps a 45° angle to provide relief for an operator's fingers in reaching about the sides of the upper portion 74 for manipulation of a lever (not shown) for operation of the presser foot 40 or for operation of switch 48. These hand reliefs are illustrated at 132.

In order to provide suitable clearance with the lower surface 134 of the upper portion 74, the portion of the link 66 to the rear of groove 102 is provided with slightly less height as illustrated by its slightly lower upper surface 136.

In case the shoulder pin 106 were to break, it is desirable that the handle 52 not be chaotically forced beyond the predetermined angle 58 and toward the knife 26. In order to thereby prevent the angular movement of the link 66 and thereby the handle 52 beyond a predetermined position, which may be substantially equal to an angle 58 of 14 degrees, even if the shoulder pin were entirely removed, in accordance with the present invention a projection 138 is provided to extend downwardly from the upper portion 74 at the front thereof to provide a shoulder, illustrated at 140, to catch or stop the portion 142 of link rearwardly of groove 102 so that no further pivotal movement of link 66 about pin 88 is allowed. However, other stop means may alternatively be provided. For example, surface 134 may, if desired, be provided without a projecting portion and portion 142 may be sized and positioned to suitably engage surface 134 during the pivotal movement. The position of the eccentric portion above the pivot point 88 also advantageously maximizes the moment which must be overcome for inadvertent movement of the handle 52 to an undesired new position.

In accordance with an example of the present invention, which is provided for the purpose of illustration and not for limitation, the block 64 may have an overall width of 1.750 inch, an overall height of 2.750 inch, and the width of each of the arms 76 and 78 may be 0.50 inch. The block 64 and the link 66 may each have an overall thickness of 0.812 inch, and the link 66 may have an overall height of 1.500 inch. Aperture 92 may have a diameter of 0.312 inch and its center may be disposed from the block bottom a distance of 0.406 inch. Aperture 110 may have a diameter of 0.562 inch, and the distance between the centers of apertures 92 and 110 may be 0.815 inch. Projection 138 extends downwardly from surface 134 a distance, illustrated at 144, which is equal to 0.062 inch. Projection 138 has a width of 0.252 inch. Corner 100 is rounded at a radius of 0.406 inch. The distance between the centers of apertures 81 and 110 is equal to 0.716 inch. Aperture 81 has a diameter of 0.406 inch with an 82 degree countersink for a 0.820 inch diameter countersink for head 82. The distance between the centers of apertures 81 and 85 is 0.500 inch, and the diameter of aperture 85 is 0.281 inch. The width 128 of groove 102 is 0.312 inch, and its vertical center is offset from the vertical center of groove 94 a distance 104 equal to 0.122 inch when the handle is horizontal. The diameter of aperture 94 is 0.312 inch. Aperture 72 is a $\frac{3}{8}$ inch-24 tap. Hand reliefs 132 are chamfered at 45° for a distance along each of the sides thereof of 0.25 inch and over a length of 1.18 inch. Pin head 116 has a diameter of 0.750 inch. An undercut of 0.06 inch by 0.02 inch is provided between the pin head 116 and portion 112. Portion 112 has a length of 0.484 inch, and portion 114 has a length of 0.480 inch. Each of the portions 112 and 114 has a diameter of 0.562 inch. The length of threaded portion 120 is 0.28 inch, and this includes an undercut adjacent portion 114. The overall length of shoulder pin 106 is 2.21 inch. This example is meant to include the exemplary dimensions previously discussed in this specification.

The position of the handle 52 may be adjusted by loosening nut 122 and by turning shoulder pin 106 by means of a screwdriver in slot 118 until the desired handle position is reached, as determined by the individual operator under the individual circumstances of use. Then the nut 122 is tightened onto pin 106 to maintain the desired position.

By adjusting the angle 58, a suitable angle of handle 52 may be achieved to allow greater use of the elbow rather than thumb muscle and to allow steerage of the machine with the arm and wrist straight for greater comfort and longer time of use before rest is required. Thus, the adjustable handle mechanism 50 is provided for greater operator comfort while achieving greater productivity safely.

It should be understood while the invention has been described in detail herein, the invention can be embodied otherwise without departing from the principles thereof, and such other embodiments are meant to come within the scope of the present invention as defined by the appended claims.

What is claimed is:

1. An adjustable handle mechanism in combination with a machine, comprising a block, means for rigidly mounting said block to a machine housing, a link, a longitudinal handle connected to said link and extending outwardly of the housing, a first pin pivotally connecting said link to said block, means comprising a second pin having an eccentric portion in engagement with said link for pivotally moving said link through a predetermined angle in response to rotatable movement of said second pin, and means for rotating said second pin whereby the angular position of the handle relative to the machine housing may be adjusted.

2. A handle mechanism according to claim 1 wherein the pivotal movement of said link is limited to said predetermined angle by the engagement of said link by said eccentric portion, the handle mechanism further comprising means in addition to said link moving means for stopping the angular movement of said link beyond a predetermined position.

3. A handle mechanism according to claim 2 wherein said stop means includes a projection on said block for engaging said link at the predetermined position.

4. A handle mechanism according to claim 1 wherein said block has a yoke shape including an upper portion and a pair of downwardly extending arms between which said link is mounted, said link including means defining a groove in an upper surface thereof which is sized for receiving said eccentric portion, the rotatable movement of said second pin being limited to 180 degrees by said groove means for movement of said link through said predetermined angle.

5. A handle mechanism according to claim 4 further comprising aperture means in said link and complementary aperture means in each of said yoke arms for receiving said first pin, said first pin being disposed below and offset from said groove means whereby the longitudinal axis of said eccentric portion moves from one side to the other of the vertical axial plane of said first pin during rotatable movement of said second pin for adjusting said handle through said predetermined angle.

6. A handle mechanism according to claim 4 further comprising a downward projection from a lower surface on said block upper portion for engaging said link for stopping the angular movement of said link beyond a predetermined position.

7. A handle mechanism according to claim 4 wherein said link has a thickness which is substantially equal to the distance between said yoke arms to provide a tight fit therebetween for minimizing lateral movement of the handle.

8. A handle mechanism according to claim 1 wherein said mounting means comprises a first screw having a countersunk head portion and a second screw having a head portion which overlaps said first screw head portion for preventing loosening thereof.

9. A handle mechanism according to claim 1 wherein said second pin extends through a width of said block and includes a head at one end for engaging a side of said block, the other end of said second pin having a threaded portion, the distance between said head and said threaded portion being less than said width of said block, and the handle mechanism further comprising an oversize nut for threadedly engaging said threaded portion and tightly bearing against the opposite side of said block for preventing rotation of said second pin during machine operation.

10. A handle mechanism according to claim 1 further comprising means defining at least one champered edge portion of said block for providing hand relief for reaching a lever on the machine.

11. A handle mechanism according to claim 1 wherein said link is removably attachable to said handle.

12. A handle mechanism according to claim 1 wherein said handle position is adjustable through an angle of about 14 degrees.

13. A cutting machine comprising a housing, a knife mounted to said housing for vertical reciprocating movement, a base slidable along a surface for receiving of material in position for cutting by said reciprocating knife, and an adjustable handle mechanism rigidly mounted to said housing for grasping to slide said base along a surface, said adjustable handle mechanism comprising a block, a link, a longitudinal handle extending outwardly of said housing and connected to said link, a first pin pivotally connecting said link to said block, means comprising a second pin having an eccentric portion in engagement with said link for pivotally moving said link through a predetermined angle in response to rotatable movement of said second pin, and means for rotating said second pin whereby the angular position of the handle relative to the machine housing may be adjusted.

14. A cutting machine according to claim 13 wherein the pivotal movement of said link is limited to said predetermined angle by the engagement of said link by said eccentric portion, the cutting machine further comprising means in addition to said link moving means for stopping the angular movement of said link beyond a predetermined position.

15. A cutting machine according to claim 14 wherein said stop means includes a projection on said block for engaging said link at the predetermined position.

16. A cutting machine according to claim 13 wherein said handle position is adjustable between a first position wherein said handle is oriented at an angle of about 90 degrees relative to the longitudinal axis of said knife and a second position wherein said handle is oriented to extend downwardly at an angle of about 76 degrees relative to the longitudinal axis of said knife.

17. A cutting machine according to claim 13 wherein said block has a yoke shape including an upper portion and a pair of downwardly extending arms between which said link is mounted, said link including means defining a groove in an upper surface thereof which is sized for receiving said eccentric portion, the rotatable movement of said second pin being limited to 180 degrees by said groove means for movement of said link through said predetermined angle.

18. A cutting machine according to claim 13 further comprising means for mounting said block to said housing, said mounting means comprising a first screw having a countersunk head portion and a second screw having a head portion which overlaps said first screw head portion for preventing loosening thereof.

19. A cutting machine according to claim 13 further comprising means defining at least one champered edge portion of said block for providing hand relief for reaching a lever on the machine.

20. A cutting machine according to claim 13 further comprising means for preventing rotation of said second pin during machine operation.

21. A cutting machine comprising a housing, a knife mounted to said housing for vertical reciprocating movement, a base slidable along a surface for receiving of material in position for cutting by said reciprocating knife, and an adjustable handle mechanism rigidly mounted to said housing for grasping to slide said base along a surface, said adjustable handle mechanism comprising a block, a link, a longitudinal handle extending outwardly of said housing and connected to said link, a pin connecting said link to said block, means for pivoting said link about said pin for adjusting the angular position of said handle relative to said knife, and a projection on said block for engaging said link for stopping the angular movement of said link beyond a predetermined position.

* * * * *